(No Model.)  3 Sheets—Sheet 1.
J. M. BUSSEY.
SAWMILL CARRIAGE.
No. 473,726.  Patented Apr. 26, 1892.
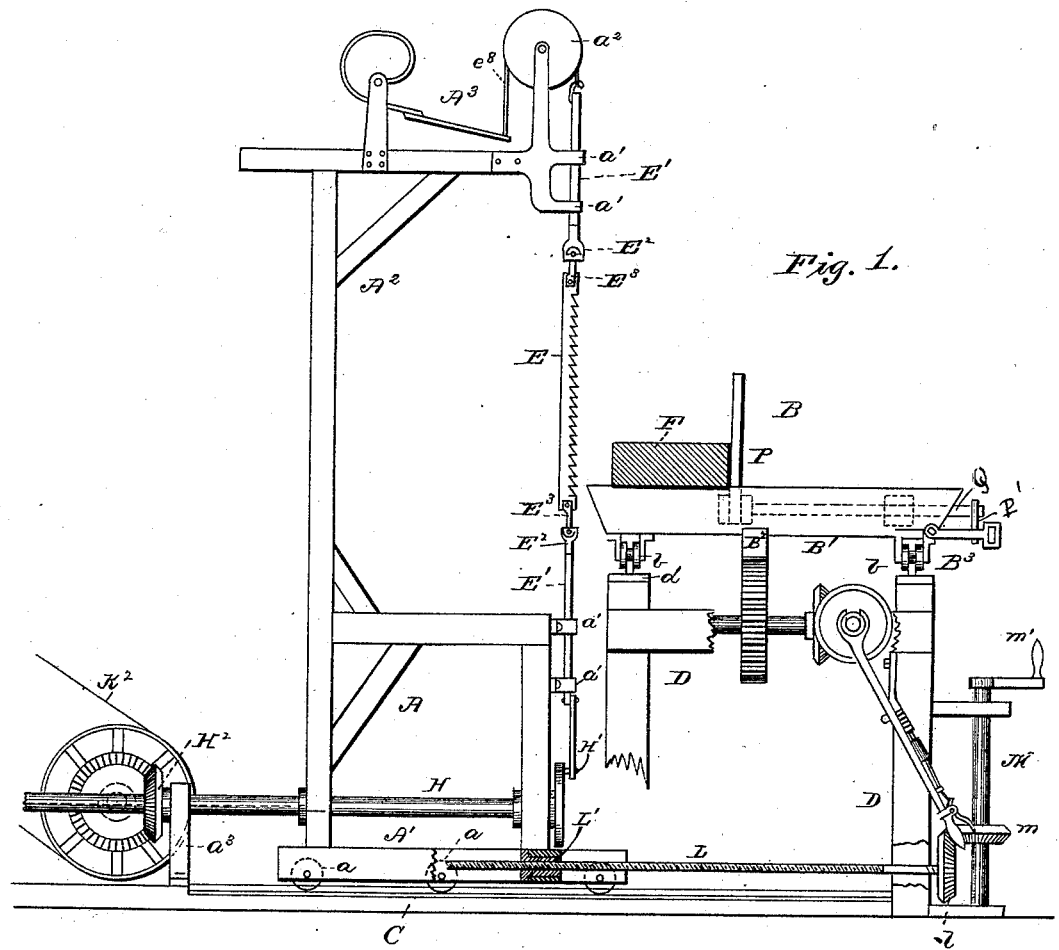
Witnesses
M. B. Harris
J. C. Wilson
Inventor
John M. Bussey
By Whitman & Wilkinson
Attorneys (No Model.) 3 Sheets—Sheet 2.
J. M. BUSSEY.
SAWMILL CARRIAGE.
No. 473,726. Patented Apr. 26, 1892.
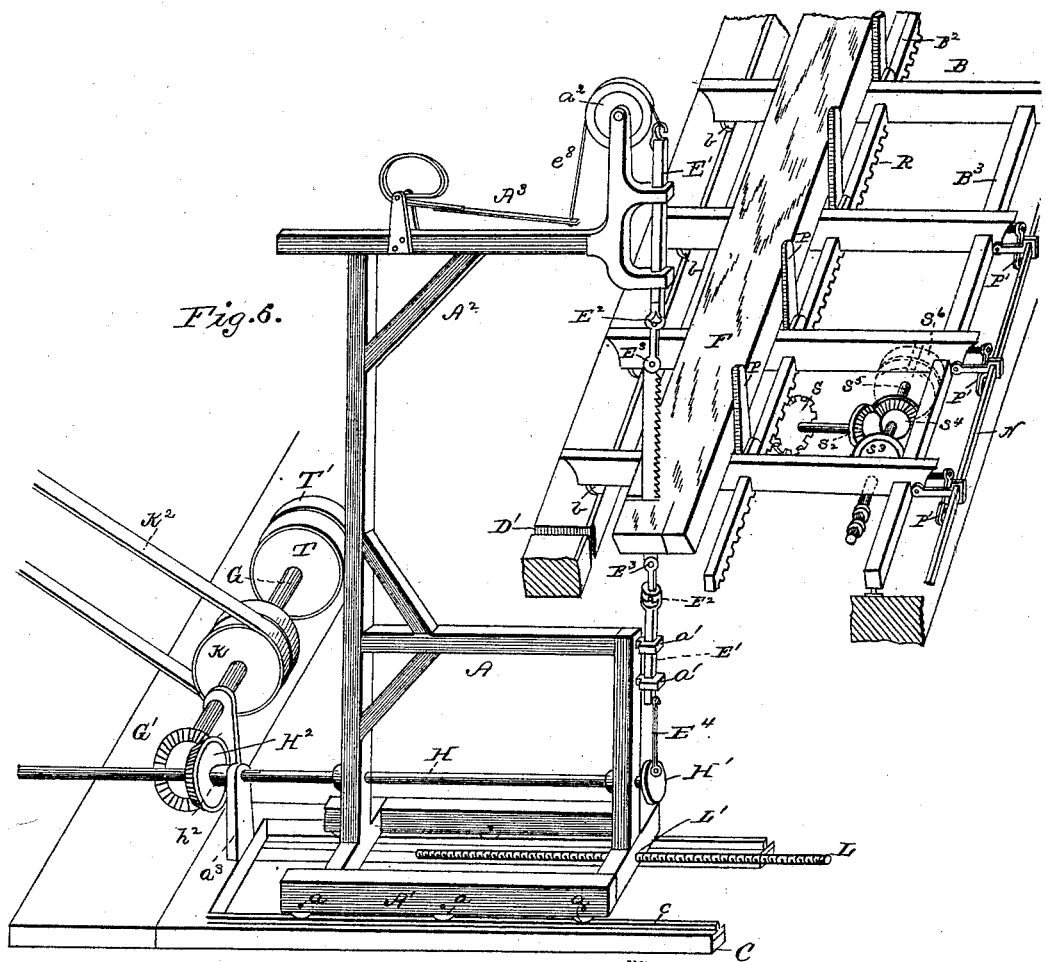
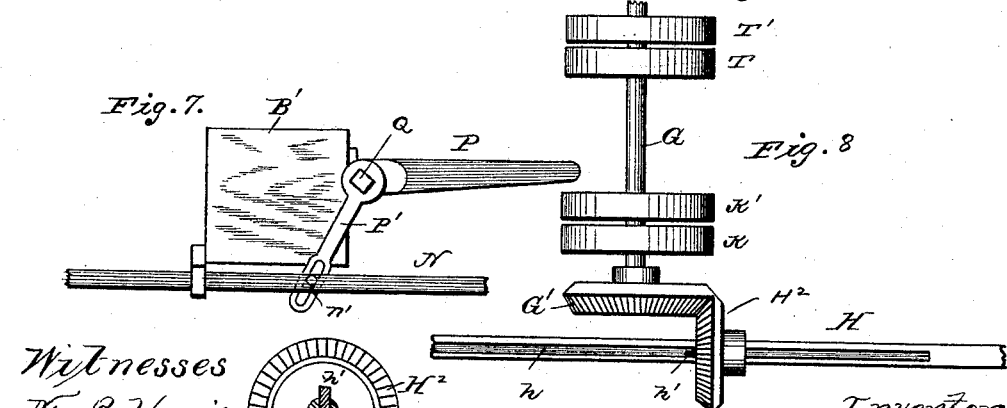
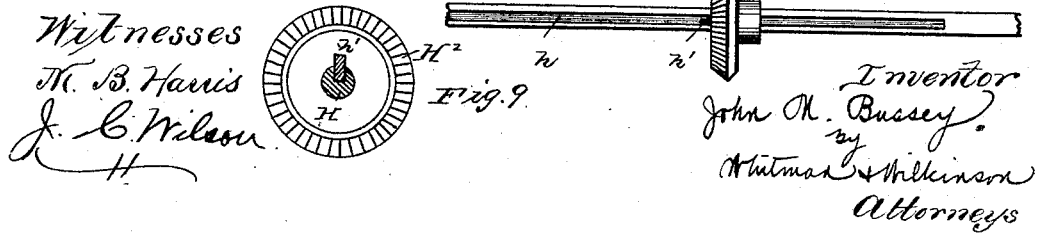
Witnesses
W. B. Harris
J. C. Wilson
Inventor
John M. Bussey
by
Whitman & Wilkinson
Attorneys

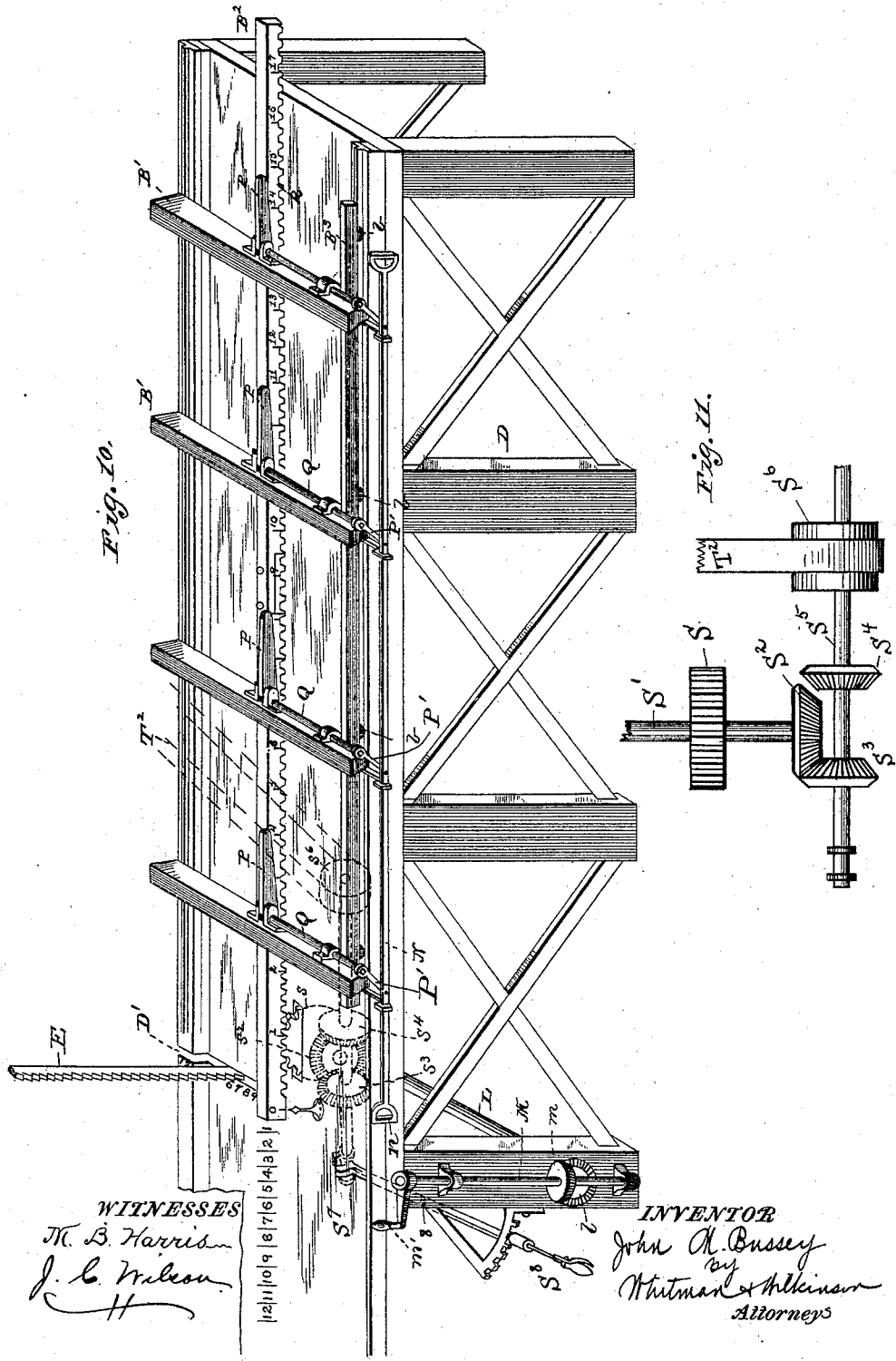

UNITED STATES PATENT OFFICE.

JOHN MORGAN BUSSEY, OF EDGEFIELD, SOUTH CAROLINA.

SAWMILL-CARRIAGE.

SPECIFICATION forming part of Letters Patent No. 473,726, dated April 26, 1892.

Application filed June 9, 1891. Serial No. 395,622. (No model.)

*To all whom it may concern:*

Be it known that I, JOHN MORGAN BUSSEY, a citizen of the United States, residing at Edgefield, in the county of Edgefield and State of South Carolina, have invented certain new and useful Improvements in Sawmill-Carriages; and I do hereby declare the following to be a full, clear, and exact description of the invention, such as will enable others skilled in the art to which it appertains to make and use the same.

My invention relates to certain improvements in jig-saw mills, and it is especially applicable to the framing or cutting of rough or dressed lumber in the right lengths, making shoulders thereon, cutting tenons, or for such other purposes for which the common jig-saw is used.

The said invention consists of certain devices herein described and claimed.

My device consists, essentially, of two carriages mounted upon trucks or slides and moved by suitable gearing. On one of these carriages the timber to be cut is placed, and on the other the saw is mounted. In sawing across a timber or at right angles to the timber-carriage the saw-carriage moves forward or backward, as the case may be, while the timber-carriage is at rest. In ripping a timber or sawing in the direction of the axis of the timber-carriage the saw-carriage is at rest, while the timber-carriage moves backward or forward, as the case may be. The beveled edges in hip and valley rafters may be sawed either by placing the timber at the proper angle on the timber-carriage and moving the said carriage against the jig-saw or leaving the timber parallel to the axis of the said carriage. By a proper adjustment of the relative speeds of the saw and timber carriages, according to the well-known parallelogram of velocities, the timber might be cut at any desired angle. Thus where both saw and timber carriage have the same velocity the timber will be cut at an angle of forty-five degrees. The saw is set so that it may be adjusted at any desired angle. I have shown a device with four positions for the saw in its frame; but it will be seen that it may be easily adapted to cut at any desired angle.

Reference is had to the accompanying drawings, wherein the same parts are indicated by the same letters and figures.

Figure 1 represents a side elevation of the saw-carriage and a transverse vertical section of the timber-carriage and frame, parts being broken away. Fig. 2 is a perspective view of the saw-rod for the saw. Fig. 3 is a perspective view of the device for connecting the saw to the saw-rod. Fig. 4 represents a side elevation of the socket secured to the end of the saw-rod and having a plurality of grooves therein for setting the saw at the desired angle. Fig. 5 represents a horizontal section of the device shown in Fig. 4 along the line $xx$, looking down. Fig. 6 is a perspective view of the saw-carriage and timber-carriage, parts being broken away. Fig. 7 represents a side elevation of the device for raising the timber-shores. Fig. 8 represents a plan view of a portion of the main driving-shaft and the saw-shaft. Fig. 9 represents an end view of the saw-shaft, looking to the left and showing the means of attaching the sliding bevel-gear thereto. Fig. 10 represents a perspective view of part of the timber-carriage and frame-work supporting the same and the hand-gearing for moving the saw-carriage. Fig. 11 represents a plan view of the feed-gear for the timber-carriage.

A represents the saw-carriage, and B the timber-carriage, mounted upon the frame-work C and D, respectively. The saw-carriage A has a platform A′, mounted on trucks $a$, preferably running on rails $c$, as in sawmill-carriages generally. The frame-work $A^2$ carries the spring $A^3$ and pulley $a^2$, while $a'$ are the guides for the saw-rod.

E represents the saw, and E′ the angular saw-rod connected by means of the joint $E^2$ and saw-handle $E^3$ to the saw. This joint $E^2$ has bolts $e^2$, which engage in the bolt-holes $e^3$ in the saw-rod E′. In the lower end of the joint $E^2$ are a plurality of grooves $e^4$, adapted to receive the pin $e^5$ in the saw-handle. A bolt passing through the bolt-hole $e^6$ and the saw secures the said handle to the saw. The upper saw-rod, after passing through the guides $a'$ $a'$, hooks, by means of the hook $e^7$, into the chain $e^8$, which passes over the pulley $a^2$ and is made fast to the strong spring $A^3$.

The lower end of the lower saw-rod is joined by the connecting-rod $E^4$ to the crank-pin $H'$ on the counter-shaft H. This counter-shaft is driven from the driving-shaft G by means of the bevel-gears $G'$ and $H^2$. In order that the said gears may continue to engage as the saw-carriage is moved backward or forward, the gear $H^2$ has a collar $h^2$, which butts against the fixed post $a^3$, while the counter-shaft H has a longitudinal slot $h$, into which the key $h'$ of the bevel-gear $H^2$ slides. This key allows the said bevel-gear to slide longitudinally along the said counter-shaft, but prevents it from turning about the said shaft. Motion is given to the shaft G by the belt $K^2$, engaging the fast pulley K.

$K'$ is a loose pulley; but any other means of moving the shaft G may be adopted.

The saw-carriage is moved along its tracks by the long screw L, engaging a nut $L'$, rigidly attached to the said carriage. The vertical shaft M, handle $m'$, and bevel-gears $m$ and $l$ show one method of turning the screw L, and so of moving the saw-carriage backward or forward.

The timber-carriage B is mounted on trucks $b$ on rails $d$ on the frame-work D. This carriage consists, essentially, of a number of cross-pieces $B'$, a central longitudinal timber or stringer $B^2$, and a side timber $B^3$ on the side opposite the saw. On the side next the saw the cross-pieces $B'$ carry the trucks near their ends and the space between two consecutive pieces is open, so that the saw may have room to work. A slot $D'$ is left in the frame-work abreast of the saw, so that the latter may be run in for a fresh cut and out again, whenever desired. At the opposite end of the cross-pieces $B'$ the stringer $B^3$ is secured to give strength and rigidity to the timber-carriage. Near the center of the timber-carriage the stringer $B^2$ is secured, running longitudinally. Beneath this stringer the rack R is attached. This rack engages the pinion S, mounted on the shaft $S'$, set in journals (not shown) in the frame-work D. On the end of this shaft $S'$ the bevel-gear $S^2$ is situated, meshing with either of the bevel-gears $S^3$ or $S^4$. These bevel-gears are mounted on a shaft $S^5$, journaled beneath the carriage. The shaft $S^5$ is driven by the pulley $S^6$, connected by the belt $T^2$ to the fast and loose pulleys T and $T'$ on the drive-shaft G. The shaft $S^5$ has a loose collar $S^7$, mounted thereon to which the lever $S^8$, pivoted at 8, is attached. By means of this lever the shaft $S^5$, which should be adapted to move a few inches longitudinally, may be so moved that either of the gear-wheels $S^3$ or $S^4$ may engage the gear-wheel $S^2$, and so the pinion S may be rotated in either direction and a movement either backward or forward may be given to the timber-carriage at will.

While the fast and loose pulleys K and $K'$ and T and $T'$ are represented as being on one common drive-shaft, they may be on separate shafts and driven independently, if it be so desired.

In order that the timber F may not be pressed backward by the saw, the movable arms or shores P are attached to the timber-carriage. In order that these arms may be simultaneously raised and lowered when put into or taken out of use, I provide a long rod N, running through eyebolts in the framework D and having a handle $n$. A rock-shaft Q, running along each cross-piece $B'$, carries the arm P at one end and the slotted arm $P'$ at the other. The stud $n'$ on the sliding rod N engages in the said slot. It will be readily seen from Fig. 7 that if the rod N be pushed to the right that all the arms P will be raised, while if the rod N be drawn to the left, as shown in Fig. 7, then all the arms P will be lowered between the cross-pieces $B'$ and out of the way.

On the frame-work D, beneath the central stringer $B^2$, I have a scale of feet and inches marked, beginning at the slot $D'$ for the saw, and I also have a scale of feet and inches to mark the distance traversed by the saw along that slot.

The operation of my device is as follows: Suppose it be desired to saw off the end of a rectangular timber and then to cut a shoulder in the end two feet long by nine inches deep. The timber is first gotten on the timber-carriage in any convenient way and the shores P pulled up by means of the rod N. The timber is then steadied against the said shores and the timber-carriage is moved along by the feed-gear until the rough end of the timber is abreast of the saw. The timber-carriage is now stopped and the saw-carriage is moved ahead, and at the same time the saw is started by shifting the belt from the loose pulley to the fast pulley. When the rough end of the timber is sawed off, the saw is backed out, the timber-carriage run ahead two feet by the scale on the frame-work, and the saw run in to the depth of nine inches, as can be seen by the scale on the side of the slot. The saw is now backed out and the pin $e^5$ is turned at right angles in the slot $e^4$ and the timber-carriage is moved again clear of the saw-slot. The saw-carriage is then run out until the saw is abreast of the nine-inch mark, when the timber-carriage is moved down against the saw, and when the saw has ripped in for two feet the block will drop out, leaving the finished shoulder. For cutting hip and valley rafters the timber may be either set at an angle on the timber-carriage and sawed, as before, or the saw may be set at an angle appropriate to the combined speed of the saw-carriage and timber-carriage. For this latter purpose either a very narrow saw or very careful management would be necessary. I have shown the joint $E^2$ as having four grooves for the pin $e^5$, corresponding to a motion of the saw to the right or the left, forward or backward; but by increasing the number of these slots or by substituting joints grooved at different angles any desired angle for the saw may be obtained.

Having thus described my invention, what I claim, and desire to secure by Letters Patent of the United States, is—

1. In a framing-mill for cutting lumber, the combination, with a timber-carriage mounted on a suitable frame-work, of a saw-carriage mounted on trucks at right angles to said timber-carriage, with means for moving said saw-carriage backward and forward, a jig-saw mounted on said saw-carriage, a revolving shaft mounted on said saw-carriage and adapted to drive said saw, said shaft having a longitudinal slot therein, a bevel gear-wheel mounted loosely on said shaft and having a key sliding in said groove, but holding said bevel gear-wheel against turning on said shaft, a fixed stanchion behind said bevel gear-wheel and holding the same against backward pressure, a driving-shaft, a bevel gear-wheel mounted thereon engaging said gear-wheel on the slotted shaft, and means for revolving said driving-shaft, substantially as described.

2. In a framing-mill for cutting lumber, the combination, with a jig-saw and means for imparting the reciprocating motion thereto, of the holder $E^3$, having arms $e^5$, attached to the saw, a guide-rod at each end of the saw, guides for the said rod attached to the frame-work for keeping the saw vertical and holding it against turning, and a swivel-shaped joint $E^2$, attached to the end of the guide-rods and having a plurality of recesses $e^4$ for the reception of the arms $e^5$ on the holder $E^3$, substantially as described.

3. In a carriage for a jig-saw, the combination, with suitable frame-work, of a shaft journaled in the said frame-work for driving the saw, a spring at the opposite end of the saw for drawing the saw backward, a rope or chain connected at one end to said spring, a grooved pulley receiving said rope or chain, two square guide-rods, one attached to the other end of said rope or chain and the other connected by a connecting-rod and crank-pin to the said shaft, a swivel-shaped joint having a plurality of grooves attached to the ends of said guide-rods next the saw, a jig-saw, and holders therefor, with arms on the said holders for engaging in the said grooves in the swivel-shaped joint, substantially as described.

4. In a device for altering the angle at which a jig-saw is set, the combination, with a saw and suitable guide-rods for keeping that saw at the desired angle, of a holder attached to each end of the saw, having arms extending therefrom, and a swivel-shaped joint attached to each saw-rod, having a plurality of recesses therein adapted to receive said arms, substantially as described.

5. In a framing-sawmill for cutting lumber, the combination, with a movable and angularly-adjustable saw, of a fixed frame-work having a slot therein for the admission of said saw, a lumber-carriage mounted on said frame-work and having cross-pieces carrying the trucks, and a central string-piece carrying the feed-rack and only one side timber, thus having the side next the saw open, except for the cross-pieces, substantially as described.

6. In a framing-mill, the combination, with a movable saw-carriage and an angularly-adjustable saw, of the frame-work for the timber-carriage, having the slot $D'$ in one side timber thereof for the entry of the saw, all substantially as described, and the timber-carriage moving upon the said frame-work, said timber-carriage consisting, essentially, of the cross-pieces $B'$, carrying the trucks, the central string-piece $B^2$, carrying the feed-rack, and the side piece $B^3$ for stiffening the carriage, substantially as described.

In testimony whereof I affix my signature in presence of two witnesses.

JOHN MORGAN BUSSEY.

Witnesses:
 LUTHER G. BELL,
 ROBT. A. MARSH.